(12) United States Patent
Di Martino (10) Patent No.: US 8,151,664 B2
(45) Date of Patent: Apr. 10, 2012

(54) TRANSMISSION UNIT PROVIDED WITH A CONTROL DEVICE FOR A MOTOR VEHICLE

(75) Inventor: Alessandro Di Martino, Pomigliano D'Arco (IT)

(73) Assignee: Elasis-Societa Consortile per Azioni, Pomigliano D'Arco (IT)

( * ) Notice: Subject to any disclaimer, the term of this patent is extended or adjusted under 35 U.S.C. 154(b) by 664 days.

(21) Appl. No.: 12/224,476

(22) PCT Filed: Mar. 1, 2007

(86) PCT No.: PCT/EP2007/051972
§ 371 (c)(1),
(2), (4) Date: Mar. 23, 2009

(87) PCT Pub. No.: WO2007/099155
PCT Pub. Date: Sep. 7, 2007

(65) Prior Publication Data
US 2009/0260471 A1 Oct. 22, 2009

(30) Foreign Application Priority Data
Mar. 2, 2006 (EP) .................................. 06425139

(51) Int. Cl.
*F16H 63/30* (2006.01)
(52) U.S. Cl. .................................................... 74/473.36
(58) Field of Classification Search ........................ None
See application file for complete search history.

(56) References Cited

U.S. PATENT DOCUMENTS

| 3,827,276 A | * | 8/1974 | Willers ........................... 74/363 |
| 5,000,060 A | * | 3/1991 | Reynolds et al. ................ 74/745 |
| 6,164,149 A | * | 12/2000 | Ohmori et al. .............. 74/336 R |
| 6,883,395 B2 | | 4/2005 | Lanz .............................. 74/335 |

FOREIGN PATENT DOCUMENTS

| EP | 0 435 832 | 11/1990 |
| EP | 0 553 017 | 7/1993 |
| FR | 2 862 366 | 5/2005 |
| JP | 58110328 | 6/1983 |

OTHER PUBLICATIONS

International Search Report dated May 24, 2007 from PCT/EP2007/051972.

* cited by examiner

*Primary Examiner* — Raymond W Addie
(74) *Attorney, Agent, or Firm* — Ohlandt, Greeley, Ruggiero & Perle, L.L.P.

(57) ABSTRACT

A transmission unit for a motor vehicle is provided with a fixed supporting structure, a driving transmission shaft and at least one driven transmission shaft that are parallel to one another, and a control device, which has a control member that is movable with respect to the supporting structure; the control member is able to translate along a control axis between a plurality of operating positions, each associated to a corresponding range of gears, and to turn, in each operating position, about the control axis between an idle angular position and at least one engagement angular position, in which it controls engagement of a gear forming part of the range selected; the control member is set at least in part in front of an axial end of the transmission shafts.

9 Claims, 8 Drawing Sheets

TRANSMISSION UNIT PROVIDED WITH A CONTROL DEVICE FOR A MOTOR VEHICLE

TECHNICAL FIELD

The present invention relates to a transmission unit provided with a control device for a motor vehicle.

BACKGROUND ART

As is known, the configurations of an automobile gear change are characterized by rather consolidated schemes, which envisage use of: a primary shaft, on which the driving gears are fitted, either idle or fixed; a secondary shaft, on which the driven gears are fitted, again either idle or fixed; a mechanism for synchronization and engagement between the idle gears and the shaft on which these are fitted; a pair of gears for final reduction of the transmission ratio at output from the secondary shaft; and, finally, a differential, which supplies the final output of the motion to two axle shafts.

The above arrangement is accompanied by a control device, which constitutes an interface between the driver and the synchronization and engagement mechanism. In particular, the transmission ratios or gears are engaged selectively by operating, in the passenger compartment, a gear lever. Said lever actuates a finger-shaped control member, which in turn actuates a series of gearshift forks, which are movable in a direction parallel to the axes of the primary and secondary shafts. The gearshift forks are arranged on the outside of said shafts, correspond to respective ranges of the gears (for example, the range of the first and second gears, the range of the third and fourth gears, and the range of the fifth and reverse gears), and are associated to respective parallel control seats facing one another, engaged by the finger member. The finger member is movable along a selection path that freely traverses the control seats for selecting one of said control seats and, hence, a range of gears (first and second, or else third and fourth, or else fifth and reverse) and along an engagement path parallel to the planes of lie of the control seats for displacing the seat selected and engaging one of the two gears of the corresponding range, said finger member shifting in opposite directions starting from a central position, to which there corresponds an idle or "neutral" condition. In general, one of the two paths of the finger member is rectilinear, whilst the other is defined by a rotation.

In known solutions, each gearshift fork engages a corresponding sleeve of the synchronization and engagement mechanism. For each pair of idle gears associated to the same range and fitted on the same shaft (whether primary or secondary), the synchronization and engagement mechanism is normally provided with: a hub fitted externally on the shaft; a pair of driving rings arranged on opposite axial sides of the hub, each of which is angularly fixed with respect to a corresponding gear and which have respective external toothings; and a pair of rings for synchronizing the motion that are able to activate the driving rings selectively.

The synchronizing rings are each set axially between the hub and the corresponding driving ring, have respective conical friction surfaces designed to co-operate, in use, with corresponding conjugated friction surfaces carried by the driving rings, and are provided with respective external toothings.

The sleeve is set on the outside of the hub and is rendered angularly fixed with respect to the hub itself by means of an internal toothing of its own. The sleeve can slide axially on opposite sides of the hub under the action of the corresponding gearshift fork. During the axial travel of the sleeve in one direction or else in the other, the internal toothing of the sleeve engages first the external toothing of the synchronizing ring and then the external toothing of the driving ring, when the relative speed of the latter with respect to the synchronizing ring goes to zero as a result of the contact between the respective conjugated friction surfaces.

The gear change of a known type just described, although satisfactory from the functional standpoint, requires as a whole a space that is relatively large, in particular, in a radial direction alongside the primary and secondary shafts.

DISCLOSURE OF INVENTION

The aim of the present invention is to provide a transmission unit for a motor vehicle which will enable the problems set forth above to be solved in a simple and inexpensive way and, preferably, will be provided with a control device that is simple, precise in controlling selection and engagement of the gears and can bring about engagement of the gears from within the primary and secondary shafts.

According to the present invention, a transmission unit for a motor vehicle is provided, which comprises:
- a fixed supporting structure;
- a driving transmission shaft and at least one driven transmission shaft that are parallel to one another; and
- a control device comprising a control member that:
  a) is movable with respect to said supporting structure with a translational motion for selection of the ranges of the gears along a control axis between a plurality of operating positions, each associated to a corresponding range of gears; and
  b) can turn, in each of said operating positions, about said control axis between an idle angular position and at least one engagement angular position, in which it controls engagement of a gear forming part of the range selected, said transmission unit being characterized in that said control member is set at least in part in front of an axial end of said transmission shafts.

Preferably, the transmission unit further comprises a plurality of seats that can be selected by said control member during said translational motion of selection, each of said selectable seats being associated to a corresponding range of gears and being movable independently of the other seats in response to the rotation of said control member between an idle position and at least one engagement position, corresponding to those of said control member, said selectable seats forming part of respective levers that can turn about said control axis.

Conveniently, when said selectable seats are arranged in their respective idle positions, they are aligned with respect to one another in a direction parallel to said control axis, said control member comprising at least one control finger that is radial with respect to said control axis and can slide freely through said selectable seats during said translational motion of selection.

In particular, said control member comprises a control spindle, which carries fixedly said control finger, said levers being fitted around said control spindle and being kept axially packed tight between two supporting portions, which are carried in fixed positions by said supporting structure and are traversed by said control spindle.

Preferably, the transmission unit comprises a pair of sleeves, which are fitted on said control spindle in positions angularly free and axially fixed, are arranged on opposite axial sides of said control finger, and each of which is coupled to one corresponding said supporting portion in an angularly fixed and axially slidable way; all the levers except one being fitted on said sleeves in angularly fixed positions; a remaining lever being selectively engaged by said control finger.

BRIEF DESCRIPTION OF THE DRAWINGS

For a better understanding of the present invention, a preferred embodiment is now described purely by way of non-limiting example, with reference to the attached plate of drawings, wherein.

BEST MODE FOR CARRYING OUT THE INVENTION

Figure 1:
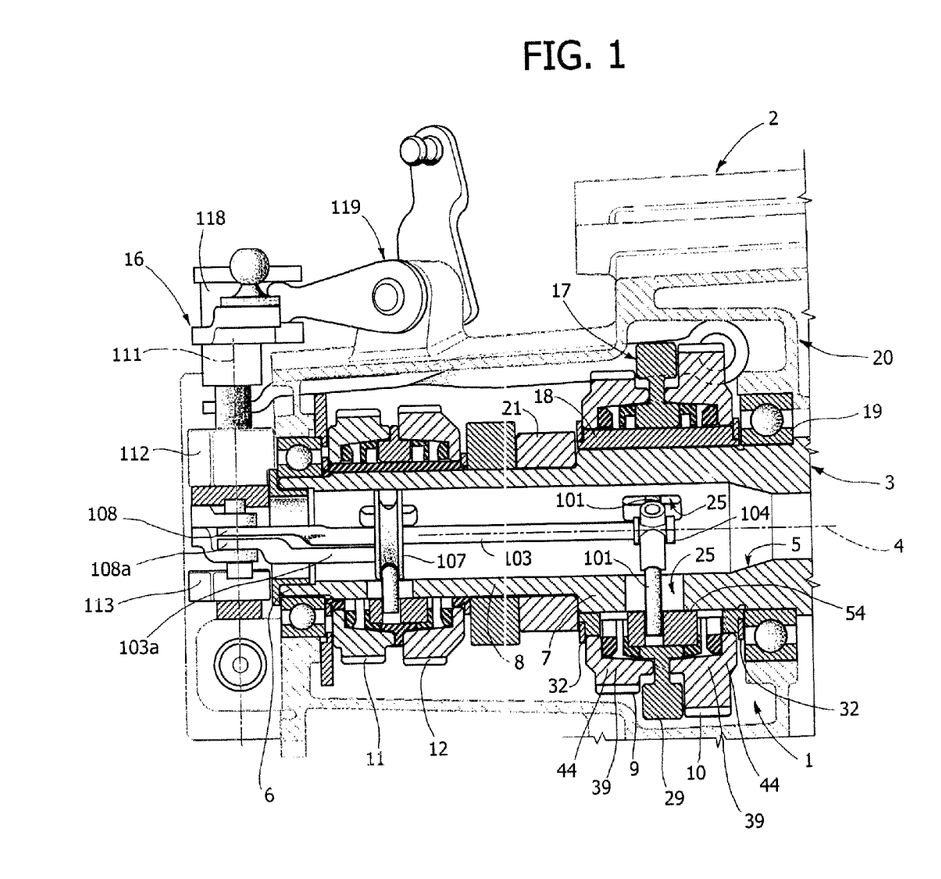
FIG. 1 is a cross-sectional view of a preferred embodiment of the transmission unit provided with a control device for a motor vehicle according to the present invention.

In FIG. 1, the reference number 16 designates a control device forming part of a gear change 2 or transmission unit (partially shown) for a motor vehicle (not shown).

The gear change 2 comprises two or three transmission shafts that are parallel to one another, of which one is the primary driving shaft. FIG. 1 shows partially just one of said shafts, designated by the reference number 3. The shaft 3 has an axis designated by 4, is axially hollow, i.e., has a cavity 5 that gives out at one end 6 through an opening, and comprises two intermediate portions 7 and 8, which carry respective pairs of gears, designated, respectively, by 9, 10 and by 11, 12.

Figure 6:
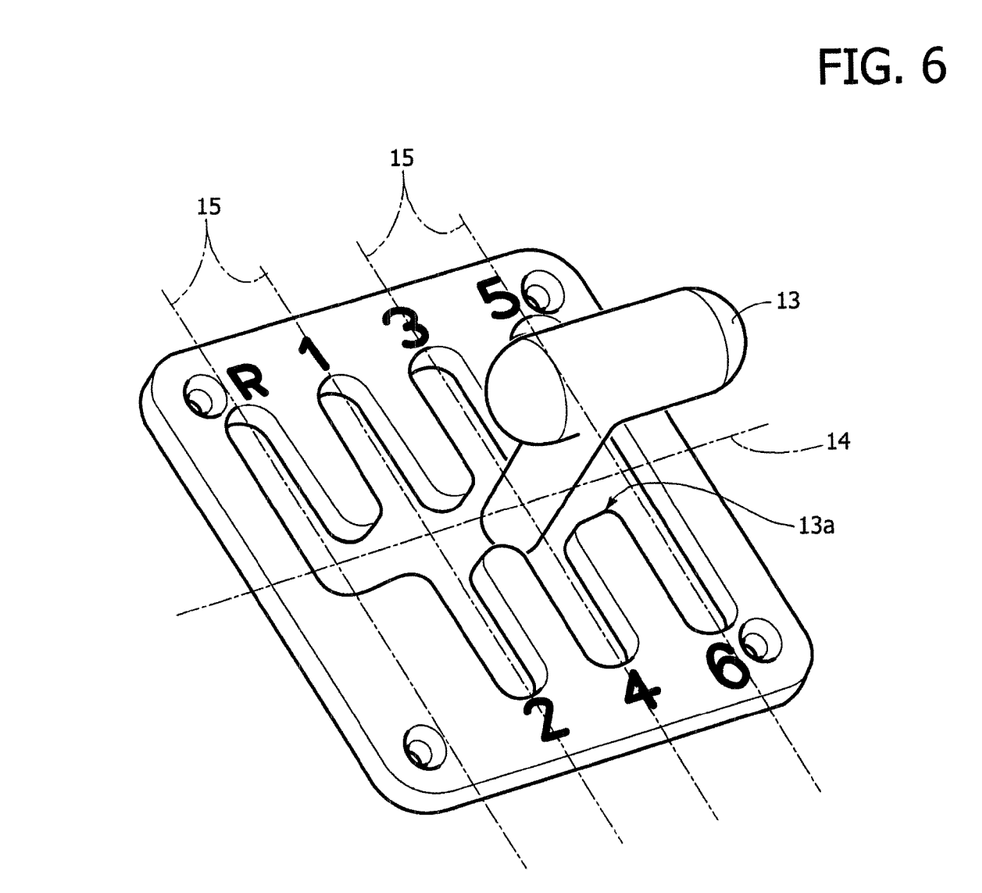
FIG. 6 shows, as a whole, a gear lever of the transmission unit of FIG. 1.

The gears 9-12 are angularly idle and axially fixed with respect to the shaft 3 and mesh permanently with respective gears (not shown) fitted on another shaft of the gear change 2. Each pair of idle gears is associated to a corresponding range of gears, which is activated by the driver of the motor vehicle by operating a control grip 13, for example, the gear lever that is shown in FIG. 6 and that is movable in a grid 13a of seats. Via said grip 13 it is possible to select the different ranges of the gears, i.e., the range of the first and second gears, the range of the third and fourth gears, the range of the fifth and sixth gears, and the range of the reverse gear, by shifting the grip 13 in the grid 13a along a transverse selection path 14 and keeping in any case the gear change 2 in a neutral condition, and it is possible to engage, for the range selected, the two corresponding gears, shifting the grip 13 in the grid 13a along a longitudinal engagement path 15 starting from a central position in one direction or, respectively, in the opposite one.

Once again with reference to FIG. 1, the grip 13 actuates a device 1 for synchronization and engagement via the control device 16. The following description refers to the part of the device 1 that is associated to the pair of gears 9 and 10, it being understood that the remaining part associated to the other ranges is analogous.

The device 1 comprises a hub 17, which is fixed and coaxial with respect to the shaft 3 and comprises, in turn, an internal bushing 18, which is fitted on the portion 7 in a fixed angular position, for example via a grooved coupling (not shown), and is withheld axially, on one side, by the internal ring of a bearing 19, which keeps the shaft 3 coupled, so that it can turn axially, to a supporting structure 20 obtained via casting, and on the other side by a locator spacer ring 21 fitted in a fixed axial position on the shaft 3.

Figure 2:
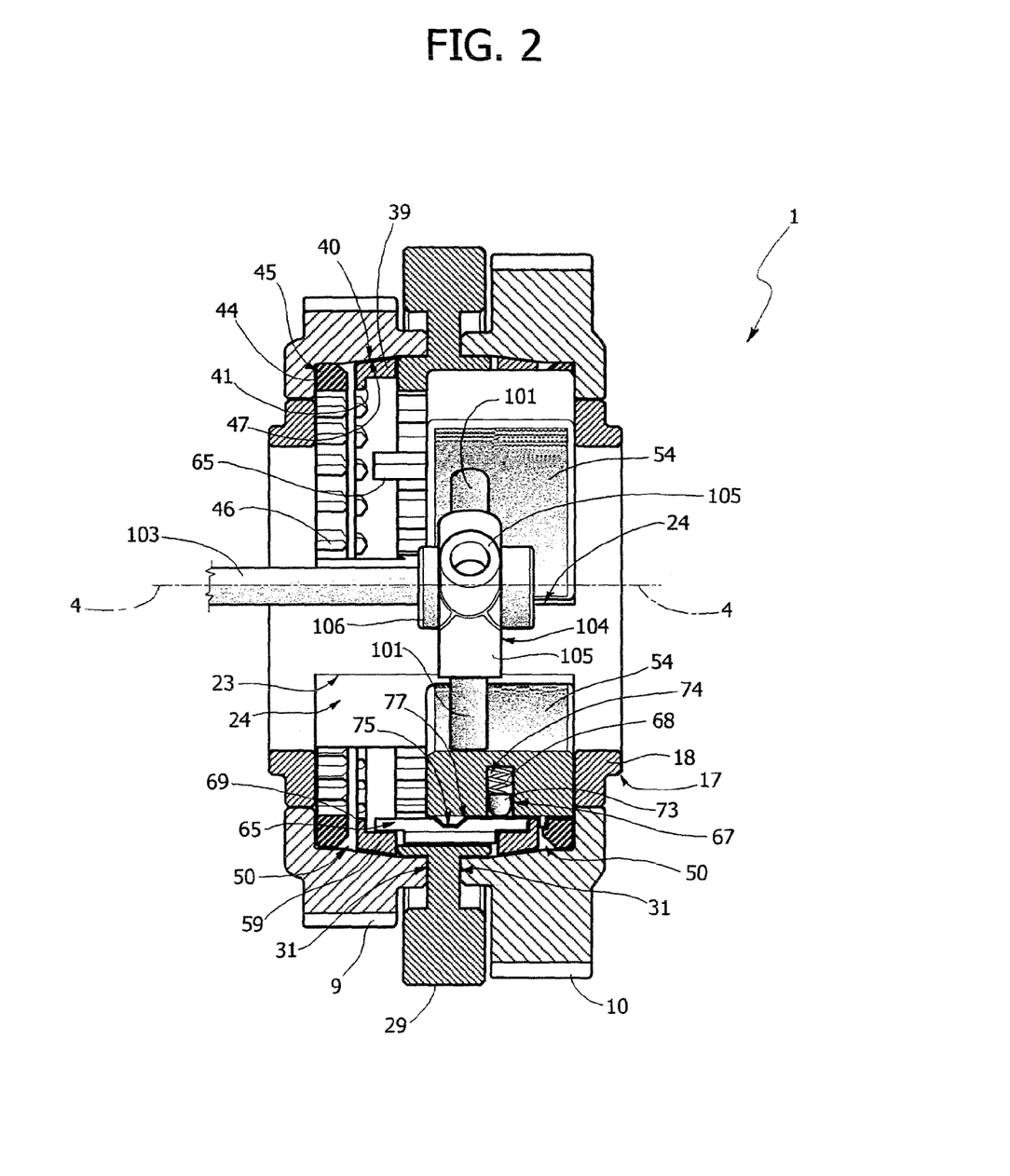
FIG. 2 shows at an enlarged scale, with parts in cross section and with parts removed for reasons of clarity, a synchronization and engagement device of the transmission unit of FIG. 1, at the end of an engagement manoeuvre.
Figure 3:
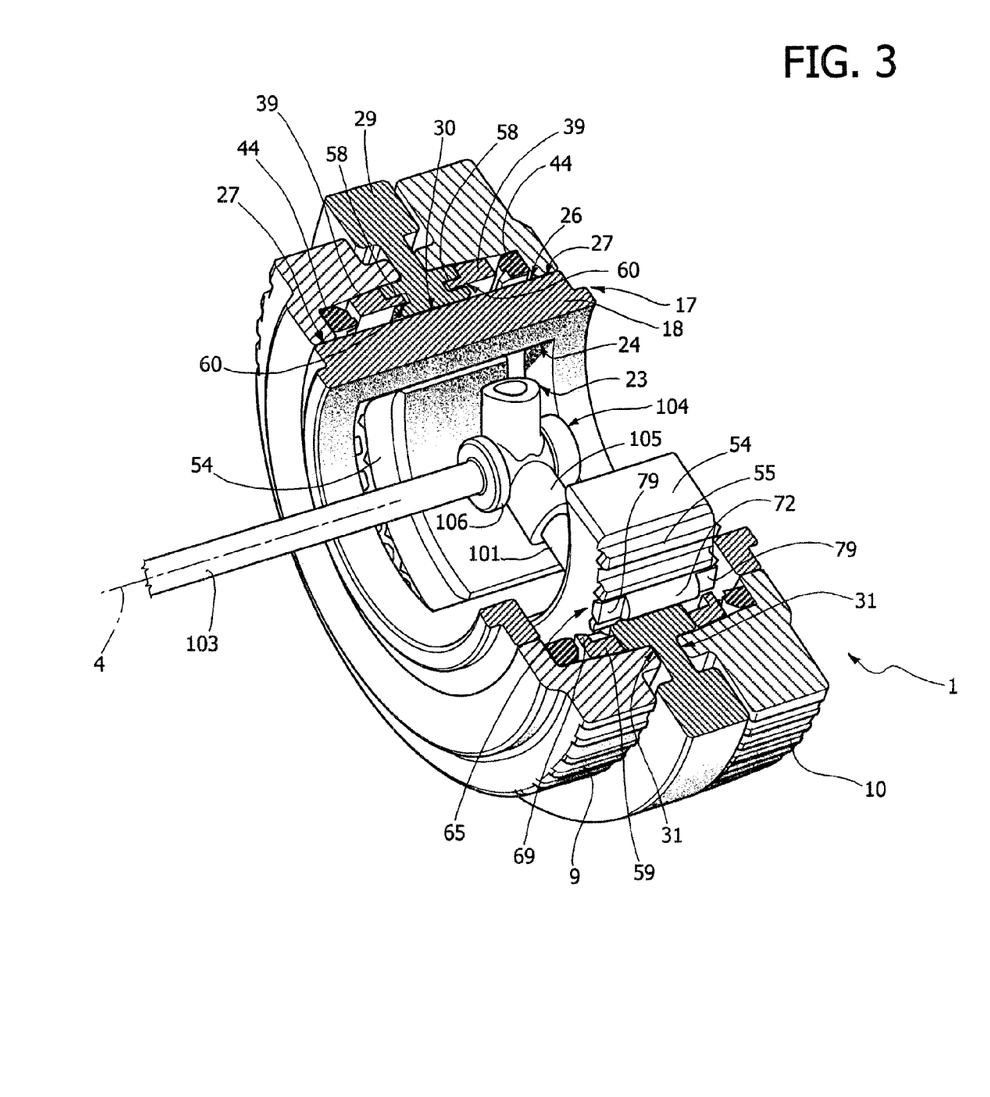
FIG. 3 is a perspective view of the synchronization and engagement device of FIG. 2, sectioned with a different plane of section and set in an idle condition.

According to what is shown in FIGS. 2 and 3, the bushing 18 has three seats 23, which are arranged at 120° apart from one another about the axis 4, have the shape of a cylindrical sector, pass in a radial direction through the bushing 18, and have respective pairs of plane axial-guide surfaces 24 facing one another in a circumferential direction. In a position corresponding to the seats 23, the shaft 3 has respective through slots 25, which are made in a radial direction and are axially elongated (FIG. 1).

The bushing 18 has an external cylindrical surface 26 (FIG. 3) comprising two terminal areas 27, on which there are coupled idle and sliding the internal cylindrical surfaces of the gears 9 and 10, respectively.

The hub 17 further comprises an external ring gear 29, which is coupled in a fixed and coaxial position on a central area 30 of the surface 26 (FIG. 3) in a way not described in detail, for example by means of welding, and defines a spacer between the gears 9 and 10. In particular, each gear 9, 10 is sandwiched in an axial direction between a corresponding face 31 of the ring gear 29 and a corresponding ring 32 fitted on the axial end of the bushing 18 (FIG. 1).

Once again with reference to FIGS. 2 and 3, the device 1 further comprises two floating synchronizing rings 39, which are arranged on axially opposite sides of the ring gear 29 and are each provided with a conical friction surface 40 (FIG. 2) facing radially outwards, and a toothing 41 facing radially inwards.

The device 1 further comprises two driving rings or flanges 44 coaxial to the bushing 18, each of which is set between a corresponding ring 39 and a corresponding gear 9, 10 and is fixed with respect to the latter. In particular, each ring 44 is welded to an internal surface 45 of the corresponding gear 9, 10 and has a toothing 46 facing radially inwards. The surface 45 of each gear 9, 10 comprises a conical friction area 47 (FIG. 2), which is set in an intermediate position between the ring gear 29 and the corresponding ring 44, is mated to the surface 40 of the corresponding ring 39, and co-operates, in use, with said surface 40.

In particular, for each gear 9, 10, the surface 45, the bushing 18, and the face 31 of the ring gear 29 define an annular chamber 50 housing the rings 44 and 39.

The device 1 then comprises three engagement members 54, which are angularly set at equal distances apart about the axis 4, are completely housed, each, in a corresponding seat 23, have the shape of a cylindrical sector, are coupled to the surfaces 24 so as to receive or transmit a torque with respect to the bushing 18, and are able to slide jointly with one another under the control of the device 16 and under the guidance of the surfaces 24 so as to translate axially between a central idle, or neutral, position, in which they leave the gears 9, 10 idle, and two opposite lateral-end-of-travel engagement positions, in which they render the shaft 3 angularly fixed with respect to the gear 9 or 10 selectively.

In particular, the members or sectors 54 have a cylindrical toothing 55 (FIG. 3), which faces radially outwards and meshes progressively with the toothing 41 and hence with the toothing 46 during translation from the central idle position towards any one of the lateral end-of-travel engagement positions, thus rendering the bushing 18 angularly fixed with respect to the ring 44 and engaging the corresponding gear.

Figure 4:
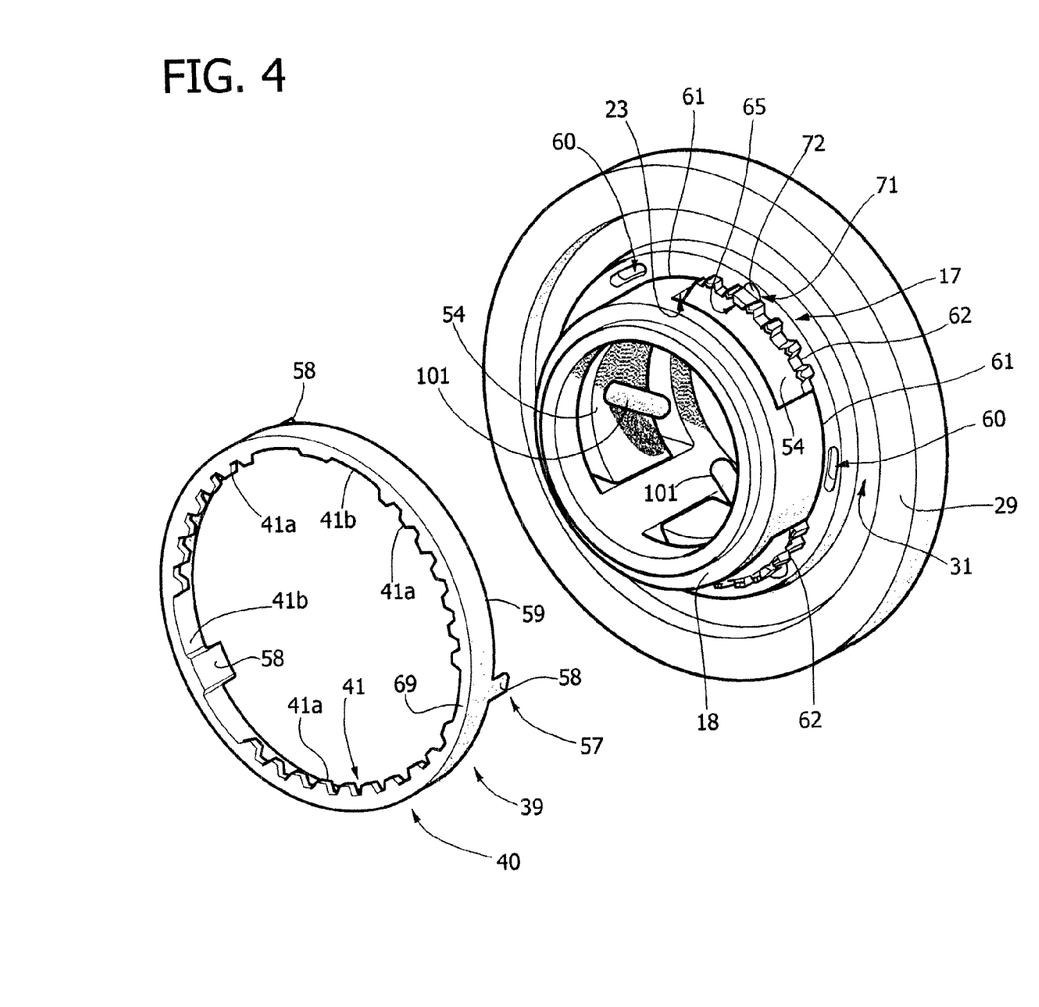
FIG. 4 is an exploded view of some components of the synchronization and engagement device of FIGS. 2 and 3.

With reference to FIG. 4, for each gear 9, 10, a device 57 of angular constraint is set axially between the face 31 and the ring 39 for limiting the angular fluctuation of the ring 39 with respect to the sectors 54. The device 57 comprises three axial teeth 58, which are fixed to an annular portion 59 of the ring 39 and are angularly set at a distance apart from one another, and three retention seats 60, which are made on the face 31 and each of which is engaged by a corresponding tooth 58 in a slidable way in a circumferential direction. The seats 60 have in a circumferential direction a dimension greater than that of the teeth 58 to enable a play equal to half the pitch of the toothing 41.

The internal radial surface of the ring gear 29 comprises three cylindrical portions 61 and three toothed portions 62 angularly alternating with one another about the axis 4. The portions 61 are coupled to the central area 30 of the surface 26, whilst the portions 62 are engaged by the toothing 55 of the respective sectors 54 in an axially slidable way.

With reference to FIGS. 2 and 4, the device 1 comprises three pre-synchronization small blocks 65, which axially face the rings 39, are coupled in an axially slidable and angularly fixed way to the sectors 54 and are coupled to the sectors 54 themselves by interposition of a retention device 67.

The device 67 comprises, for each small block 65, a corresponding spring 68 that keeps the small block 65 itself in a position axially fixed with respect to the corresponding sector 54 during a first portion of axial travel made by the sector 54 itself starting from the central idle position, referred to as pre-synchronization travel. In said first portion of travel, the small block 65 pushes an annular portion 69 of the ring 39 axially under the driving action exerted by the radial thrust of the spring 68 in order to bring the conical surface 40 to engage with the surface 47. The device 68 is releasable when the axial travel of the sector 54 continues further towards the lateral end-of-travel engagement position.

In particular, each small block 65 is set radially between a corresponding sector 54 and a corresponding toothed portion 62 of the ring gear 29, whilst the latter has three axial through grooves 71 (FIG. 4), which guide axially respective portions 72 of the small blocks 65. The device 68 comprises, for each small block 65, a corresponding pin 73, which can slide radially in a guide cavity 74 made in the corresponding sector 54. The spring 68 is housed in the cavity 74 and pushes the tip of the pin 73 to engage in an axial retention seat 75 made in the small block 65. At the end of the pre-synchronization travel, the small block 65 can no longer advance on account of the axial contrast surface, defined by the portion 69, having become fixed, so that the external tip of the pin 73 tends to follow a terminal ramp 77 of the seat 75 to exit progressively from the seat 75 itself, receding radially in the cavity 74 against the elastic action of the device 68. The seat 75 is symmetrical, i.e., it has two ramps 77 opposite to one another for operation in regard to the gears 9 and 10, respectively.

Preferably, according to what is shown in FIG. 3, the small blocks 65 have an axial length equal to that of the sectors 54, and each comprise two ends 79 arranged on opposite sides of the portion 72, which in turn projects radially outwards with respect to the ends 79 and has an axial length equal to that of the groove 71. At the same time, for each ring 39, the portion 59 surrounds an end 79 of the small blocks 65 and axially faces the portions 72, whilst the portion 69 is set alongside the portion 59 and carries the toothing 41.

The toothing 41 is discontinuous, i.e., it is made up of three toothed portions 41a, which alternate with three edges 41b without toothing and are arranged in a position corresponding to the toothings 55 of the sectors 54.

As regards the simultaneous axial driving of the sectors 54 and engagement of the gears 9 and 10, with reference to FIGS. 1 and 3, three control pins 101 are arranged at 120° apart about the axis 4, engage at one end thereof respective radial seats, each made in a corresponding sector 54, are thus fixed with respect to the sectors 54 and with respect to the shaft 3, and extend radially inwards starting from the sectors 54 themselves through the slots 25. The slots 25 have dimensions such as to enable axial translation of the respective pins 101 between the central idle position and the lateral end-of-travel engagement positions.

The device 16 comprises a control stem 103, which is coupled to the pins 101 via a cross journal 104, is housed in the cavity 5 of the shaft 3, and extends along the axis 4. The cross journal 104 comprises three radial arms 105 having respective seats engaged by the internal end of the pins 101, in a fixed position, and a central portion 106 (FIG. 3) coupled to one end of the stem 103 by means of a bearing (not shown), in particular a plain bearing.

As regards, instead, engagement of the gears 11 and 12, a stem 103a is provided in a direction parallel to, and set at a distance from, the axis 4 and, hence, the stem 103. The control pins provided for engagement of the gears 11 and 12 are carried in a fixed position by a supporting ring 107, which is traversed with play by the stem 103 and has a circular track coupled to one end of the stem 103a by means of a bearing (not shown), in particular a plain bearing.

The stems 103, 103a extend outside of the cavity 5 on the side of the end 6, where they have respective terminal portions 108, 108a external to the shaft 3 and actuated for causing translation of the stems 103, 103a themselves in a direction parallel to the axis 4 under the control transmitted mechanically starting from the grip 13.

Figure 7:
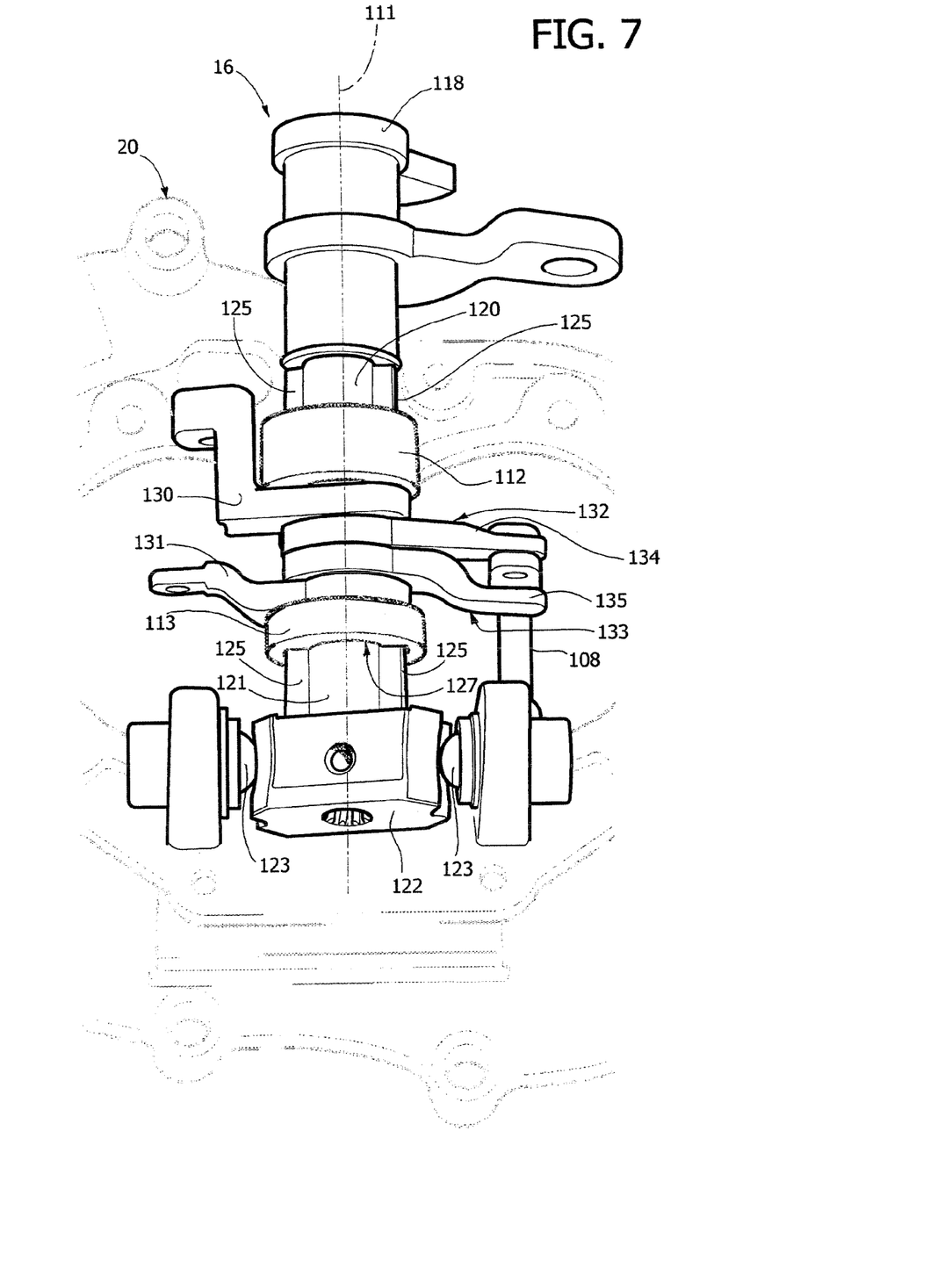
FIG. 7 is a perspective front view of the control device of FIG. 1.
Figure 8:
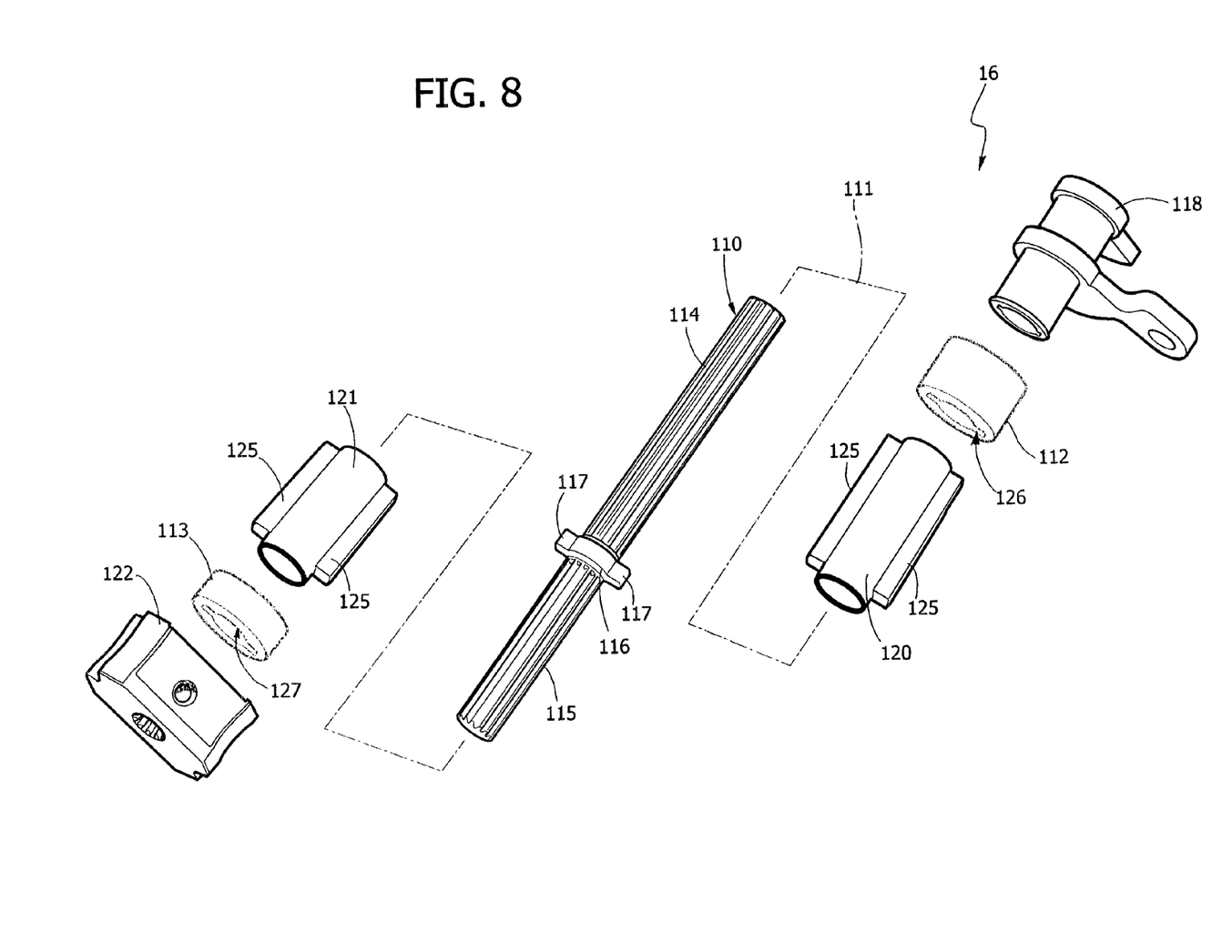
FIG. 8 is a perspective exploded view of some details of FIG. 7.

With reference to FIGS. 7 and 8, the device 16 comprises a control spindle 110, which has an axis 111 orthogonal and skew with respect to the axis 3, is set partly in a position facing the end 6 of the shaft 3 and in an intermediate position between the axis 4 and the axis of another shaft of the gear change 2, and is supported by the structure 20 via two fixed portions 112, 113 axially fixed and set at a distance from one another.

The spindle 110 comprises a top terminal axial portion 114 and a bottom terminal axial portion 115, which are provided, on the external side surface thereof, with respective knurlings or groovings. The spindle 110 further comprises an intermediate portion 116, which brings into a fixed position two fingers 117, which are diametrally opposite to one another and project radially with respect to the axial portions 114, 115.

A lever member 118 is fitted in a fixed position on the end of the axial portion 114 and is coupled to the grip 13 by means of a lever transmission 119 (partially shown and not described in detail), which is able to bestow upon the spindle 110 a motion of selection of the ranges, in translation along the axis 111, and a motion of engagement of the gears, in rotation about the axis 111 in opposite directions starting from a central reference position corresponding to the idle or neutral condition of the gear change 2.

The device 16 further comprises two sleeves 120, 121, which are arranged on opposite axial sides of the portion 116 and are fitted on the axial portion 114 and 115, respectively, in an angularly idle and axially fixed position. In particular, the sleeve 120 is gripped axially between the member 118 and the portion 116, whilst the sleeve 121 is gripped between the portion 116 and a positioning member 122.

The member 122 is fitted in a fixed position on the end of the axial portion 115 and co-operates, in a way not described in detail, with two spherical elements 123 loaded by respective springs (not shown) and carried by the structure 20, to bring the spindle 110 always back angularly into a central idle position and axially into a central reference position when the gears are disengaged, and the action of manual control on the grip 13 ceases.

The sleeves 120, 121 each carry, in a fixed position, a corresponding pair of radial appendages 125, which are diametrally opposite to one another, are elongated in a direction parallel to the axis 111, and, when the spindle 110 is in its central idle position, are aligned to the fingers 117. The sleeves 120, 121 engage in an angularly fixed and axially slidable way respective fixed guide seats 126, 127, which are made in the portions 112 and 113, respectively, and are complementary to the shape of the appendages 125 for guiding the sleeves 120, 121 themselves, and, hence, the spindle 110, along the axis 111.

The device 16 further comprises four levers 130, 131, 132, 133, which are axially packed tight between the portions 112 and 113, are hence fixed along the axis 111, are fitted on the sleeves 120, 121 and on the portion 116, each has an axial height substantially equal to that of the fingers 117, and are each associated to a corresponding range of gears.

Figure 5:
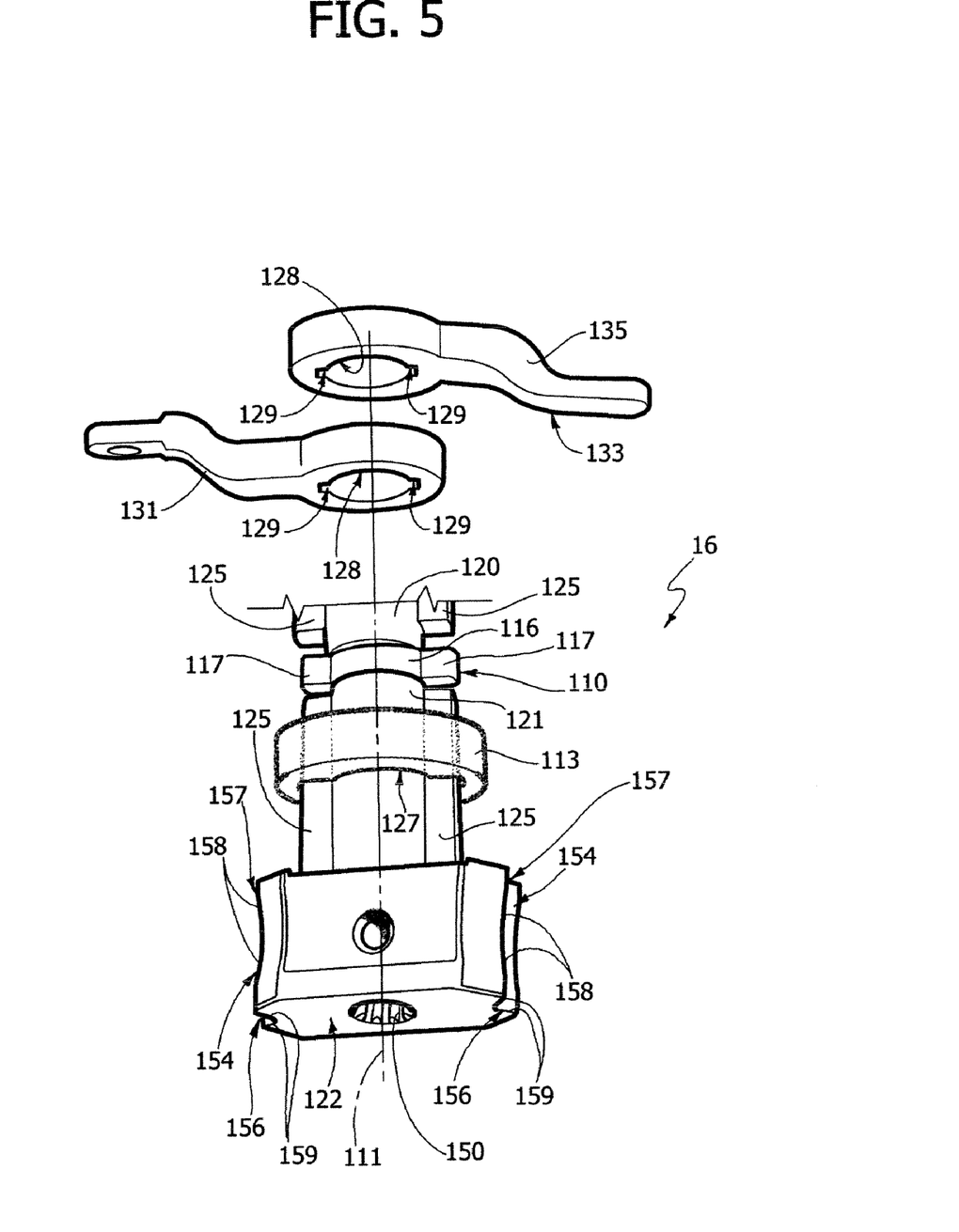
FIG. 5 is a perspective view, at an enlarged scale and with parts in exploded view, of some details of the control device of FIG. 1.

The levers 130-133 are constrained angularly to the appendages 125 of the sleeves 120, 121 or else to the fingers 117 of the portion 116. As will be described more fully hereinafter, just one of the levers 130-133 is selectively coupled to the fingers 117 to turn together with the spindle 110 about the axis 111. In particular, with reference to FIG. 5, each lever 130-133 has an axial passage 128, the internal profile of which is complementary to the external profile of the sleeves 120, 121 and of the portion 116 and is thus substantially equal to the internal profile of the seats 126, 127. The axial passage 128 consequently comprises a pair of seats 129, which are diametrally opposite to one another, are engaged in an axially slidable and angularly fixed way by the appendages 125 or else by the fingers 117, and, when they are arranged in an idle condition, are aligned with the seats 129 of the other levers in directions parallel to the axis 111, so as to be traversed freely by the fingers 117 during the translational motion of selection made by the spindle 110.

With reference to FIG. 7, the levers 130-133 comprise respective plate-like radial arms, the ends of which are coupled to the ends of respective control stems, part of which are housed in the shafts of the gear change 2. In particular, the levers 132, 133 comprise respective radial arms 134, 135, which are hinged at their ends to the portions 108 and 108a, respectively, of the stems 103, 103a, with axes of articulation parallel to the axis 111.

During the motion of selection of the spindle 110 in axial translation, the fingers 117 translate axially and come to engage in any one of the levers 130-133, whilst the other levers remain coupled to the appendages 125. In other words, during displacement of the grip 13 along the path 14, the spindle 110 translates axially so as to select one of the levers and, hence, one of the ranges.

When the grip 13 is shifted along the longitudinal engagement path 15, the spindle 110 moves with motion of engagement in rotation. The fingers 117 cause rotation about the axis 111 just of the lever selected, whilst the sleeves 120, 121, and hence the other levers, remain in a fixed angular position with respect to the structure 20.

On account of the circular path of the hinging points between the ends of the arms 134, 135 and the portions 108, 108a of the stems 103, 103a, the latter have an oscillation in the planes of lie of the respective levers 132, 133 (orthogonal to the axis 11) during the motion of engagement: for example, said oscillation is compensated by the internal play of the plain bearings present in the cross journal 104 and in the ring 107.

An axial translation of the stem 103 starting from the central idle position causes simultaneous displacement of the three sectors 54 towards the lateral end-of-travel engagement position that has been set, for example towards the gear 9. The sectors 54 in the first portion of travel (of pre-synchronization) draw along with them the three small blocks 65, thanks to the elastic action of the device 68. When the surfaces 40, 47 come to engage with one another under the axial thrust of the small blocks 65, the gear 9 substantially assumes the same speed of rotation as the ring 39, and hence as the shaft 3, given that the ring 39 is driven in rotation by the device 57 in this step.

Continuing the axial travel of the sectors 54, the pins 73 disengage from the respective seats 75, whilst the toothing 55 of the sectors 54 starts to mesh with the toothing 41 of the ring 39. During this meshing step, the toothing 41 is aligned progressively with the toothing 55 rotating in a circumferential direction, thanks to an appropriate front profile of the teeth, in itself known and not described in detail, and hence recovers the play of half a pitch defined by the device 57.

Then, in the final part of the travel of the sectors 54, the toothing 46 comes to mesh also with the toothing 55 and is aligned progressively with the toothing 55 itself, thanks to an appropriate front profile of the teeth, in itself known and not described in detail.

Obviously, disengagement is caused by an axial movement of the stem 103 and hence of the sectors 54 in an opposite direction to disengage the toothing 55 of the sectors 65 progressively from the toothings 46 and 41.

The advantages of the gear change 2 and of the device 16 are described in what follows. The fact that the control spindle 110 is set at least in part in front of a control end 6 of the transmission shafts of the gear change 2 (considering a direction parallel to the axis 4) enables limitation of the overall dimensions in a radial direction with respect to the axis 4 and also facilitation of installation of the device 16 in so far as the latter is set on the outside with respect to the space delimited by the rolling-contact bearings that keep the transmission shafts coupled to the structure 20.

The fact of making the seats 129 in the levers 130-133 enables a transmission defined by the levers 130-133 themselves to be obtained that facilitates control of the rods 103, 103a and enables the rods 103, 103a to be arranged within the shaft 4 to actuate easily the sectors 54 from within the shaft 4 itself.

In addition, the fact of making the seats 129 in the levers 130-133 limits the coupling plays between the fingers 119 and the seats 129 during rotation of the shaft 110 and hence improves precision of the engagement control.

The constructional characteristics of the device 16 described above make available a solution that is balanced from the standpoint of transmission of the forces of engagement, along with a relatively low number of components and above all contained overall dimensions. In particular, the fact of having two control fingers diametrally opposite to one another enables balancing of the forces of engagement transmitted between the levers 130-133 and the spindle 110, whilst the sleeves 120, 121 and the portions 112, 113 enable convenient guiding of the spindle 110 and the levers 130-133 with a solution that is compact and simple to install.

Finally, it is clear that modifications and variations can be made to the gear change 2 and to the device 16 described herein with reference to the figures of the attached plate of drawings, without thereby departing from the scope of protection of the present invention, as defined in the annexed claims.

In particular, the rotation and translation of the spindle 110 could be actuated by actuators, instead of via the transmission 119; the levers 130-133 could be able to turn only in one direction about the axis 111 to engage just one gear of the range associated thereto, and/or could at least in part control gearshift forks arranged on the outside of the transmission shafts of the gear change 2, instead of actuating rods arranged within the transmission shafts themselves.

The invention claimed is:

1. A transmission unit for a motor vehicle comprising:
   a fixed supporting structure;
   a driving transmission shaft and at least one driven transmission shaft that are parallel to one another; and
   a control device, comprising a control member that:
   a) is movable with respect to said fixed supporting structure with a translational motion of selection of ranges of gears along a control axis between a plurality of operating positions, each associated to a corresponding range of gears; and
   b) can turn, in each of said plurality of operating positions, about said control axis between an idle angular position and at least one engagement angular position, in which said control member controls engagement of a gear forming part of a range selected;
   said transmission unit having said control member that is set at least in part in front of an axial end of said driving transmission shaft and said at least one driven transmission.

2. The unit according to claim 1, further comprising a plurality of seats that can be selected by said control member during said translational motion of selection; each of said plurality of seats being associated to a corresponding range of gears and being movable independently of other of said plurality of seats in response to the rotation of said control member between an idle position and at least one engagement position, corresponding to said idle angular position and said at least one engagement angular position of said control member; said plurality of seats forming part of respective levers that can turn about said control axis.

3. The unit according to claim 2, wherein said plurality of seats, when they are arranged in the respective idle positions, are aligned with respect to one another in a direction parallel to said control axis; said control member comprising at least one control finger that is radial with respect to said control axis and can slide freely through said plurality of seats during said translational motion of selection.

4. The unit according to claim 3, wherein each of said levers comprises a corresponding pair of said plurality of seats diametrally opposite to one another with respect to said control axis, and in that said control member comprises two control fingers diametrally opposite to one another.

5. The unit according to claim 2, wherein said levers comprise respective radial arms, ends of which are hinged to respective control rods designed to bring about displacement of respective engagement members along axes of said driving transmission shaft and said at least one driven transmission.

6. The unit according to claim 3, wherein said control member comprises a control spindle that carries fixedly said control finger; said levers being fitted around said control spindle.

7. The unit according to claim 6, wherein said levers are kept axially packed tight between two supporting portions carried in fixed positions by said supporting structure and traversed by said control spindle.

8. The unit according to claim 7, further comprising a pair of sleeves, which are fitted on said control spindle in positions angularly free and axially fixed, are arranged on opposite axial sides of said control finger, and each of which is coupled to one corresponding said supporting portion in an angularly fixed and axially slidable way; all the levers except one being fitted on said sleeves in angularly fixed positions; a remaining lever being selectively engaged by said control finger.

9. The unit according to claim 1, further comprising actuators to bring about rotation and translation of said control member.

* * * * *